US011450897B2

(12) United States Patent
Wang et al.

(10) Patent No.: US 11,450,897 B2
(45) Date of Patent: Sep. 20, 2022

(54) BATTERY MODULE

(71) Applicant: Contemporary Amperex Technology Co., Limited, Fujian (CN)

(72) Inventors: Chong Wang, Zhangwan Town (CN); Hua Cao, Zhangwan Town (CN); Xianchun Zhu, Zhangwan Town (CN); Mu Qian, Zhangwan Town (CN); Lilei Su, Zhangwan Town (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 66 days.

(21) Appl. No.: 16/700,012

(22) Filed: Dec. 2, 2019

(65) Prior Publication Data

US 2020/0203779 A1 Jun. 25, 2020

(30) Foreign Application Priority Data

Dec. 23, 2018 (CN) ........................ 201811578100.7

(51) Int. Cl.
*H01M 10/42* (2006.01)
*H01M 10/48* (2006.01)
(Continued)

(52) U.S. Cl.
CPC ..... *H01M 10/4257* (2013.01); *H01M 10/425* (2013.01); *H01M 10/4207* (2013.01);
(Continued)

(58) Field of Classification Search
None
See application file for complete search history.

(56) References Cited

U.S. PATENT DOCUMENTS 9,991,484 B2 6/2018 Sham
2005/0206347 A1* 9/2005 Seo .................... H01M 10/482 320/150

(Continued)

FOREIGN PATENT DOCUMENTS

CN 1297590 A 5/2001
CN 102299281 A 12/2011

(Continued)

OTHER PUBLICATIONS

Machine English Translation of CN207779574U from Espacenet originally published to Wu Aug. 2018 (Year: 2018).*

(Continued)

*Primary Examiner* — Ula C Ruddock
*Assistant Examiner* — Mary Grace Byram
(74) *Attorney, Agent, or Firm* — Kilpatrick Townsend & Stockton LLP

(57) ABSTRACT

The present disclosure provides a battery module, which can include a plurality of batteries, a positioning bracket, a circuit board, a thermistor and a fixing cover plate. The positioning bracket can be affixed onto the batteries and includes a first opening. The circuit board can have a main body portion disposed above the positioning bracket and a mounting portion located below the main body portion, the mounting portion can be contained in the first opening and supported on a battery of the plurality of batteries. The thermistor can be affixed on the mounting portion of the circuit board. The fixing cover plate can tightly press the mounting portion of the circuit board in the vertical direction to fix the mounting portion to the battery.

12 Claims, 13 Drawing Sheets

(51) Int. Cl.
*H01M 50/20* (2021.01)
*H01M 50/502* (2021.01)

(52) U.S. Cl.
CPC ....... *H01M 10/482* (2013.01); *H01M 10/486* (2013.01); *H01M 50/20* (2021.01); *H01M 50/502* (2021.01)

(56) References Cited

U.S. PATENT DOCUMENTS

| | | | | |
|---|---|---|---|---|
| 2011/0117419 | A1* | 5/2011 | Lee | H01M 50/20 429/156 |
| 2015/0079437 | A1* | 3/2015 | Jeong | H01M 10/4257 429/90 |
| 2015/0291055 | A1* | 10/2015 | He | B60L 58/26 429/50 |
| 2018/0212292 | A1* | 7/2018 | Maguire | H01M 10/6554 |

FOREIGN PATENT DOCUMENTS

| | | | | |
|---|---|---|---|---|
| CN | 104380501 | A | | 2/2015 |
| CN | 104466067 | A | | 3/2015 |
| CN | 205211881 | U | | 5/2016 |
| CN | 205790269 | U | | 12/2016 |
| CN | 205863576 | U | | 1/2017 |
| CN | 106646242 | A | | 5/2017 |
| CN | 206379386 | U | | 8/2017 |
| CN | 107810567 | A | | 3/2018 |
| CN | 207183457 | U | | 4/2018 |
| CN | 108140799 | A | | 6/2018 |
| CN | 108346767 | A | | 7/2018 |
| CN | 108376757 | A | | 8/2018 |
| CN | 207779574 | U | | 8/2018 |
| CN | 207779574 | U | * | 8/2018 |
| EP | 2849252 | A1 | | 3/2015 |
| EP | 2897193 | A1 | | 7/2015 |
| EP | 3352305 | A1 | | 7/2018 |
| JP | 2002246074 | A | | 8/2002 |
| JP | 2008304295 | A | | 12/2008 |
| JP | 2016072181 | A | | 5/2016 |
| JP | 2018037186 | A | | 3/2018 |
| JP | 2018067477 | A | | 4/2018 |
| JP | 2018523269 | A | | 8/2018 |
| KR | 101642341 | B1 | | 7/2016 |
| WO | 20170147821 | A1 | | 9/2017 |

OTHER PUBLICATIONS

Form Defintion & Meaning, Merriam-Webster, Dec. 26, 2005 (Year: 2005).*

EP Application No. 19213064, European Search Report, dated May 4, 2020, 7 pages.

PCT Application No. PCT/CN2019/124360, International Search Report of The International Searching Authority, dated Mar. 6, 2020, 4 pages.

PCT Application No. PCT/CN2019/124360, Written Opinion of The International Searching Authority, dated Mar. 6, 2020, 4 pages.

The first Office Action dated Sep. 1, 2020 in corresponding Chinese Application 201811578100.7.

The second Office Action dated Nov. 13, 2020 in corresponding Chinese Application 201811578100.7.

The third Office Action dated Jan. 26, 2021 in corresponding Chinese Application 201811578100.7.

The Examination Report dated Jan. 28, 2021 in corresponding European Application 19213064.9.

The Examination Report dated Feb. 25, 2021 in corresponding Indian Application 202027042602.

The Notice of Reasons of Refusal dated Aug. 28, 2020 in corresponding Japanese Application 2019-157850.

* cited by examiner

BATTERY MODULE

PRIORITY

This application claims priority to C.N. Application No. CN201811578100.7 filed on Dec. 23, 2018, which is incorporated by reference herein.

FIELD

This disclosure generally relates to the field of batteries, and in particular to a battery module.

BACKGROUND

In a battery module with a conventional design, the temperature of the battery is generally measured by a flexible print circuit (FPC) and a thermistor. At present, the commonly used manners for the FPC and the thermistor to measure and monitor the temperature of the battery is to place thermistor on an electrical connecting piece. When the battery module is in the working condition of a large current, the overcurrent on the connecting piece is relatively large, resulting in a relatively large deviation between the measured temperature and the actual temperature of the battery. The thermistor is directly fixed to the battery by an adhesive. However, due to the influence of the temperature and battery expansion, the adhesion property of the adhesive is reduced. When the battery module is used for a long time, since the connecting reliability between the thermistor and the battery is deteriorated, the temperature measured by the thermistor is sometimes not accurate.

Therefore, a battery module with improved connecting reliability between the thermistor and the battery is needed, so that the thermistor can accurately measure the temperature of the battery.

SUMMARY

Disclosed herein is a battery module, which can include a plurality of batteries; a positioning bracket, a circuit board, a thermistor and a fixing cover plate. The positioning bracket can be affixed onto the one of the plurality of batteries and can include a first opening penetrating in a vertical direction. The circuit board can have a first main body portion disposed above the positioning bracket and a mounting portion located below the first main body portion, the mounting portion can be contained in the first opening and supported on one of the plurality of batteries. The thermistor can be affixed on the mounting portion of the circuit board. The fixing cover plate can tightly press the mounting portion of the circuit board in the vertical direction to fix the mounting portion to one of the plurality of batteries.

In some embodiments, each of the batteries can include a top cover and two electrode terminals disposed on the top cover at an interval in a transverse direction. The positioning bracket can have a second main body portion, two first positioning holes disposed in the second main body portion and configured to receive the corresponding electrode terminals, and a first extending portion formed on one side of the second main body portion in a longitudinal direction in which the first opening can be disposed in the first extending portion. The battery module can further include an electrical connecting piece located above the second main body portion of the positioning bracket and connected to the corresponding electrode terminals of the two adjacent batteries of the plurality of batteries. In some embodiments, the mounting portion can be secured to the top cover of the one of the plurality of batteries by the fixing cover plate.

In some embodiments, the circuit board can have a second opening in the first main body portion and a connecting portion extending downward from the first main body portion through the second opening in the first main body portion, in which one end of the connecting portion can be connected to the first main body portion and the other end of the connecting portion can be bent and connected to the mounting portion.

In some embodiments, the circuit board can be provided with a reinforcing plate around the position of the thermistor. The reinforcing plate can extend and exceed the thermistor in the vertical direction. The fixing cover plate can be directly pressed against the reinforcing plate in the vertical direction, to tightly press the mounting portion of the circuit board.

In some embodiments, the positioning bracket can have a first supporting portion protruding from the second main body portion in the vertical direction; and a second supporting portion protruding from the first extending portion in the vertical direction. The main body portion of the circuit board can be supported above the first supporting portion and the second supporting portion of the positioning bracket.

In some embodiments, the fixing cover plate can be located between the first main body portion of the circuit board and the battery, and can be disposed on the positioning bracket.

In some embodiments, the fixing cover plate can have a third main body portion; a second extending portion formed on both sides of the third body portion in the transverse direction and extending downwardly in the vertical direction; a first elastic protrusion disposed on a side of the second extending portion close to the first supporting portion in the longitudinal direction; and a second elastic protrusion disposed on a side of the second extending portion close to the second supporting portion in the longitudinal direction. The first elastic protrusion and the first supporting portion can be secured together, and the second elastic protrusion and the second supporting portion can also be secured together, thereby causing the third body portion of the fixing cover plate to tightly press the mounting portion of the circuit board.

In some embodiments, the fixing cover plate can have a third main body portion, in which one end of the third main body portion is hinged to the second supporting portion, and the other end of the third main body portion is configured to move up and down relative to the positioning bracket; a second extending portion formed on both sides of the third main body portion in the transverse direction and extending downwardly in the vertical direction; and a first elastic protrusion disposed on one side of the second extending portion close to the first supporting portion. The first supporting portion and the first elastic protrusion can be secured together, thereby causing the third main body portion of the fixing cover plate to tightly press the mounting portion of the circuit board.

In some embodiments, the fixing cover plate can be located above the first main body portion of the circuit board and can be disposed on the positioning bracket.

In some embodiments, the second supporting portion can be provided with a first fastening hole in the vertical direction. The fixing cover plate can have a third body portion located above the first main body portion of the circuit board; a pressing portion protruding from a position of the third main body portion corresponding to the first opening; an inserting portion protruding from the third main body portion in the vertical direction and inserted into the first fastening hole; and a third elastic protrusion formed at an end of the inserting portion away from the third main body portion and protruding circumferentially from the inserting portion. The third elastic protrusion can extend out of the first fastening hole and be secured to the second supporting portion, so that the pressing portion of the fixing cover plate can be tightly pressed against the mounting portion of the circuit board.

Further disclosed herein is a battery pack including the battery module in the present disclosure. A vehicle is also disclosed, which can include a power source to provide power for the vehicle and the above-mentioned battery pack configured to provide electricity for the power source.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
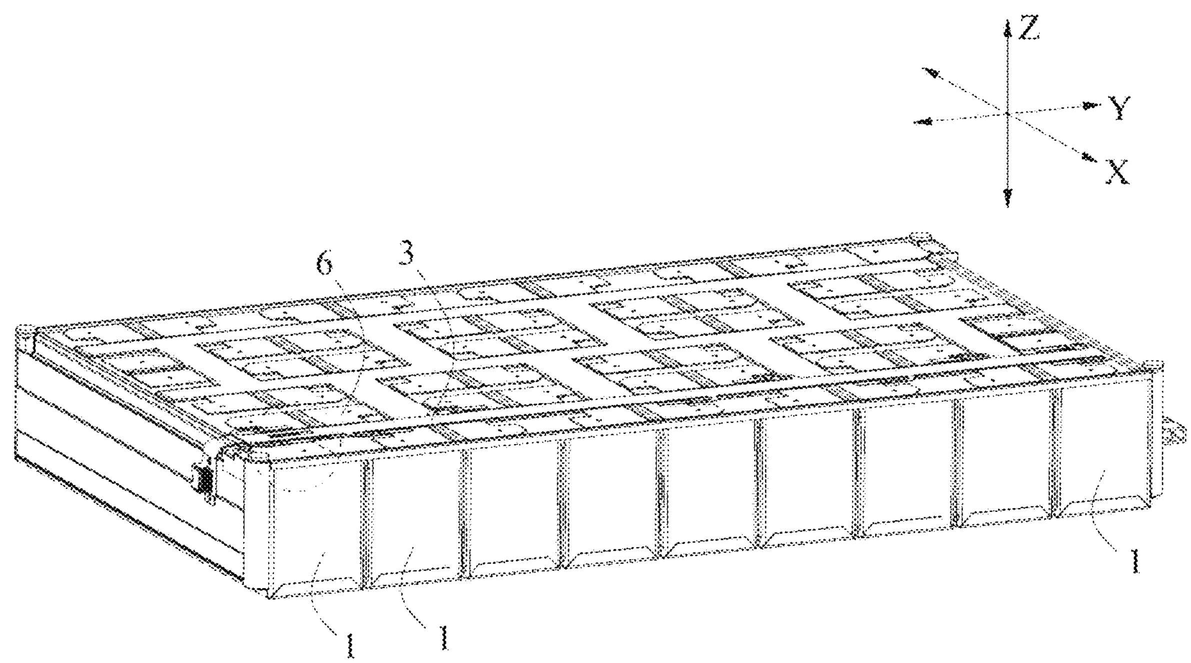
FIG. 1 is a three-dimensional diagram of a battery module, according to some embodiments of the present disclosure.

The battery module according to the present disclosure will be further described in detail with reference to the accompanying drawings.

The elements in the figures are described in the following:

1: battery
11: top cover
12: electrode terminal
13: explosion-proof valve
2: positioning bracket
21: first opening
22: second main body portion
23: first positioning hole
24: first extending portion
25: first supporting portion
251: second fastening hole
26: second supporting portion
261: fastening groove
262: first fastening hole
3: circuit board
31: first main body portion
32: mounting portion
33: second opening
34: connecting portion
4: thermistor
5: fixing cover plate
51: third main body portion
52: second extending portion
53: first elastic protrusion
54: second elastic protrusion
55: pressing portion
56: inserting portion
56A: first inserting portion
56B: second inserting portion
6: electrical connecting piece
7: reinforcing plate
8: heat conduction pad
9: heat conduction adhesive
X: transverse direction
Y: longitudinal direction
Z: vertical direction In order to clarify the objects, technical solutions, and advantages of the present application, the present application will be further described in detail below with reference to the accompanying drawings and embodiments. It is understood that the specific embodiments described herein are merely illustrative of the application and are not intended to be limiting the present application.

In the description of the present application, unless otherwise specified or defined clearly, the terms “first”, “second”, and “third” are used for descriptive purposes only, and are not to be construed as indicating or implying relative importance. The term “multiple” means two or more. Unless otherwise specified or stated, the terms “connected”, “fixed”, etc., should be understood in broad sense. For example, the “connected” may be fixedly connected or may be detachably connected, or integrally connected, or electrically connected, or connected by signals. The “connected” may be directly connected or indirectly connected via an intermediate medium. For those skilled in the art, the specific meanings of the above terms in the present application can be understood based on specific conditions.

In the description of the present specification, it is to be understood that the orientation words "upper", "lower", and the like, which are described in the embodiments of the present application, are described with the angles shown in the drawings, and should not be construed as limiting to the embodiments of the present application. In addition, in the context, it is also to be understood that when an element is referred to as "on" or "under" another element, it can be directly connected "on" or "under" another element and can also be connected "on" or "under" another element by an intermediate element. The present application will be further described in detail below by specific embodiments and with reference to the accompanying drawings.

The type of battery in the present disclosure can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery can be a lithium ion battery.

Referring to FIGS. 1 to 13, the battery module of the present disclosure can include a plurality of batteries 1, a positioning bracket 2, a circuit board 3, a thermistor 4, a fixing cover plate 5, an electrical connecting piece 6, a reinforcing plate 7, a heat conduction pad 8, and a heat conduction adhesive 9.

Figure 5:
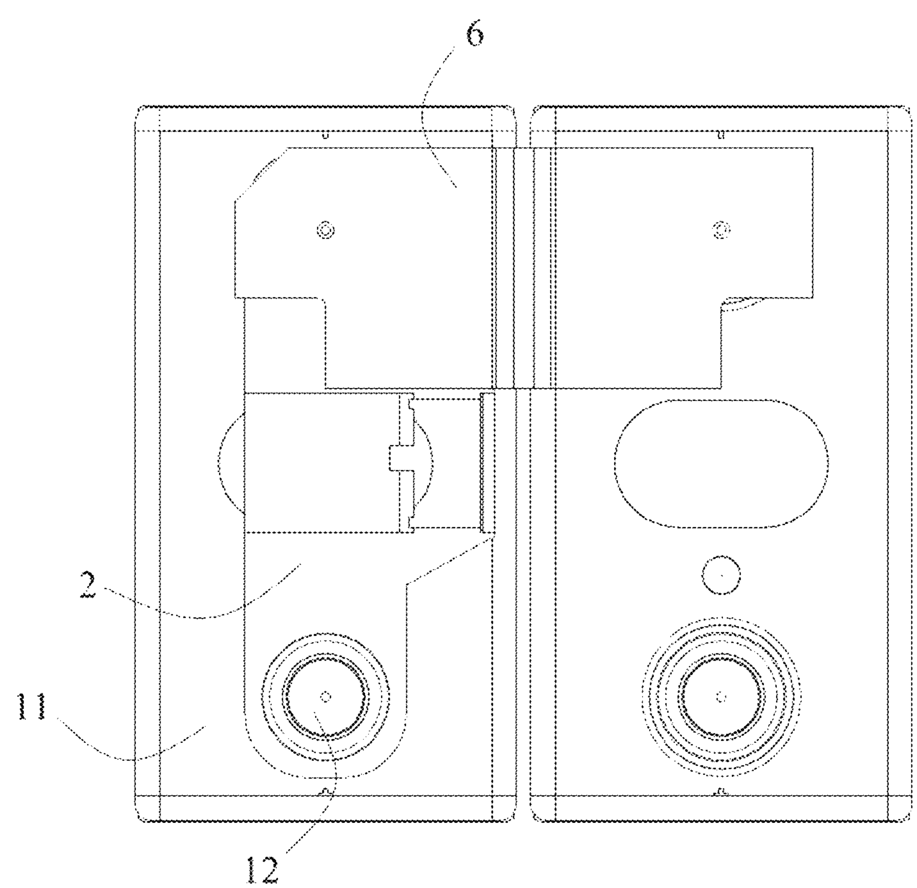
FIG. 5 is a schematic view of mounting between the positioning bracket of a battery module and the electrode terminals of a battery, according to some embodiments of the present disclosure.

Referring to FIG. 1, the plurality of batteries 1 can be arranged in a row or arranged in a plurality of rows in the transverse direction X, and the plurality of batteries 1 in each row can be arranged in longitudinal direction Y. A circuit board 3 can be correspondingly disposed above each row of batteries 1. Referring to FIG. 5, each of the batteries 1 can include a top cover 11 and two electrode terminals 12 disposed on top cover 11 at an interval in transverse direction X.

Referring to FIGS. 2 and 5 to 11, positioning bracket 2 can be fixed to battery 1 by electrical connecting piece 6, positioning bracket 2 can be provided with a first opening 21 penetrating in vertical direction Z, and thermistor 4 can be mounted at the corresponding position of first opening 21. In some embodiments, first opening 21 can provide a location for the mounting of circuit board 3 and thermistor 4, thereby facilitating the rapid assembling of the battery module.

In some embodiments, positioning bracket 2 can have: a second main body portion 22; first positioning holes 23 disposed in second main body portion 22 and hooking onto the corresponding electrode terminals 12; and a first extending portion 24, formed on one side of second main body portion 22 in longitudinal direction Y, and first opening 21 can be disposed in the first extending portion 24. Electrical connecting piece 6 can be located above first body portion 22 of positioning bracket 2 and connected to the corresponding electrode terminals 12 of two adjacent batteries 1 to fix positioning bracket 2 to battery 1.

Examples for the circuit board can include, but not limited to Flexible Printed Circuit (FPC) and flexible flat cable (FFC). In some embodiments, circuit board 3 can be an FPC.

Figure 2:
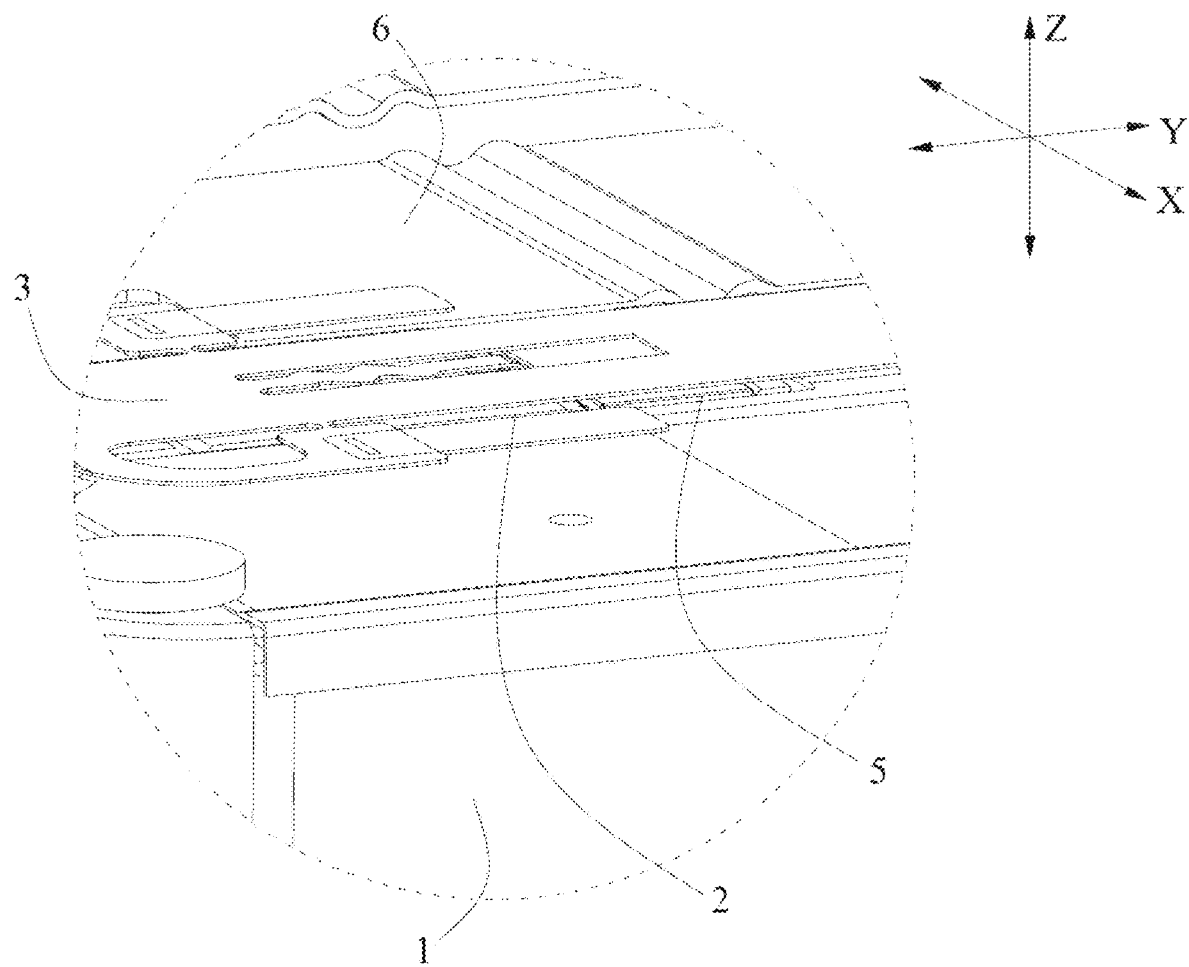
FIG. 2 is an enlarged view of a circled portion in FIG. 1, according to some embodiments of the present disclosure.
Figure 3:
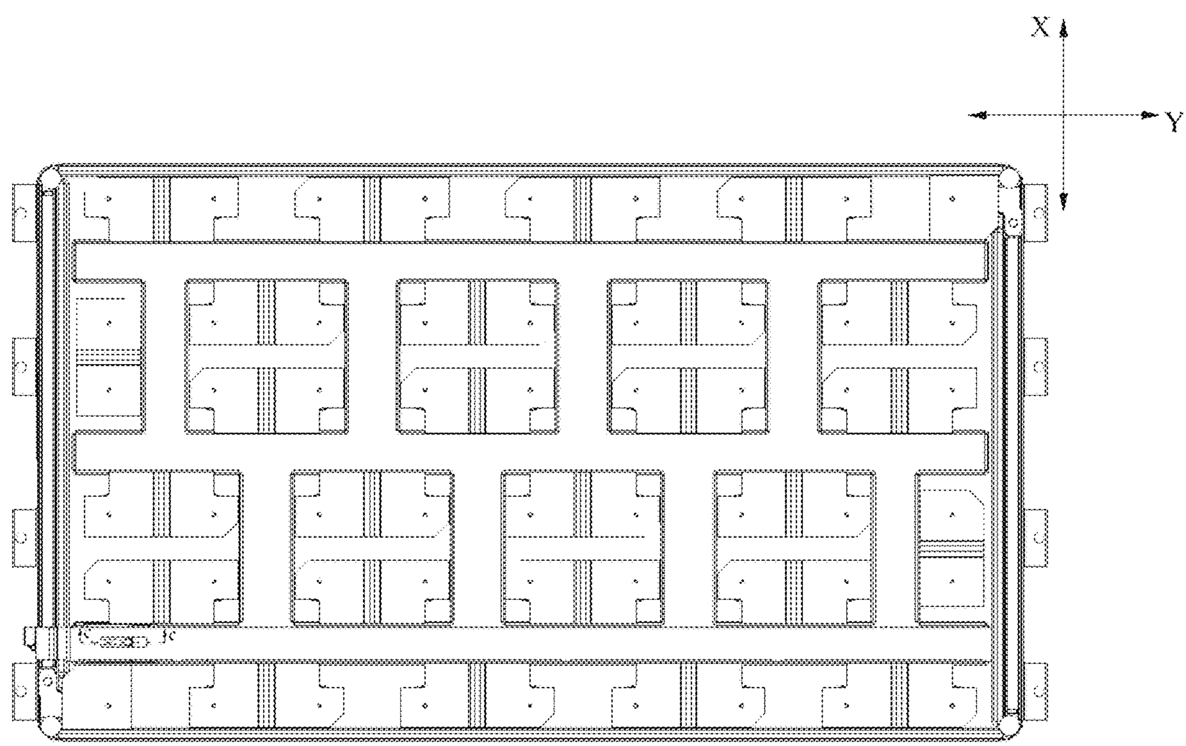
FIG. 3 a top view of FIG. 1, according to some embodiments of the present disclosure.
Figure 4:
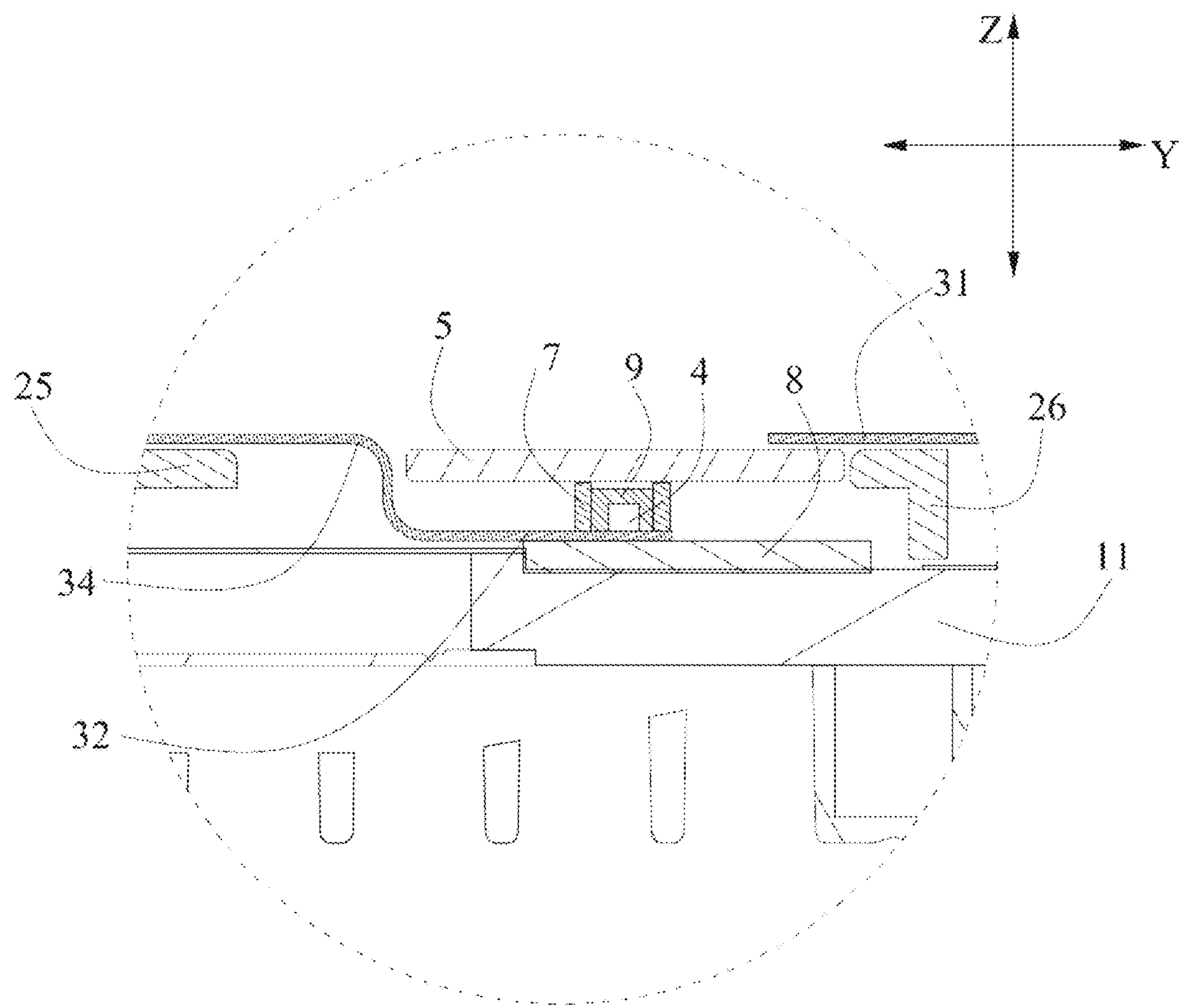
FIG. 4 is a cross-sectional view taken along the line C-C in FIG. 3, according to some embodiments of the present disclosure.
Figure 6:
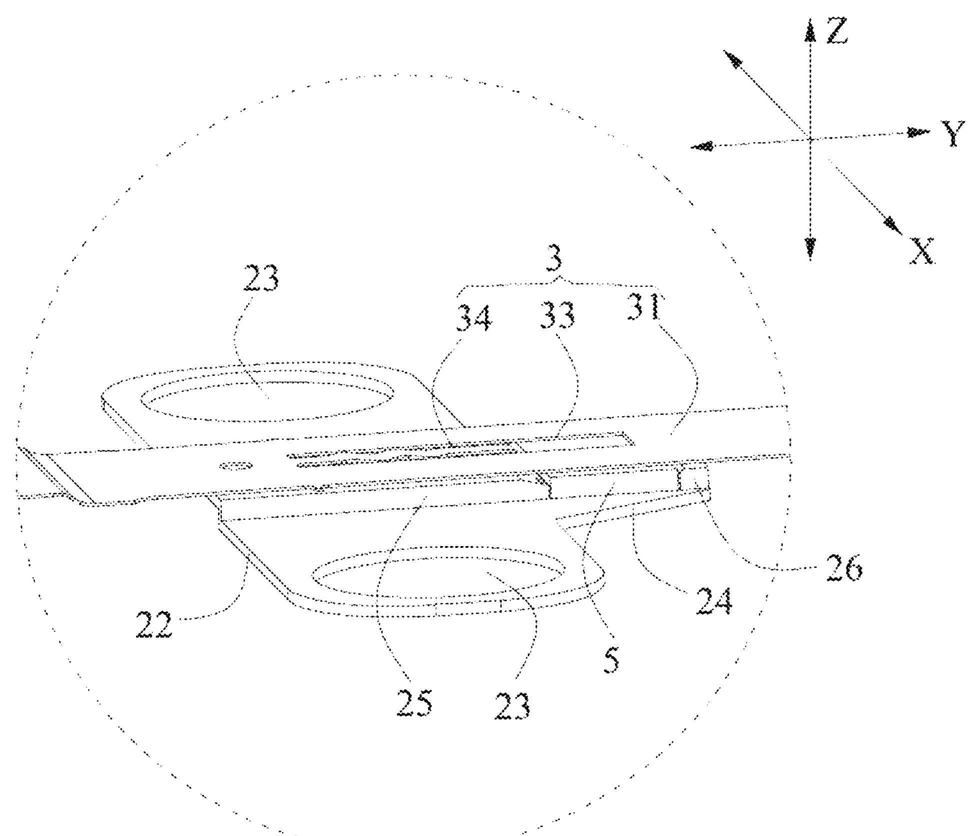
FIG. 6 is a schematic view of mounting between a circuit board, a thermistor, the positioning bracket, and a fixing cover plate of the battery module, wherein only a part of the circuit board is shown for the sake of clarity, according to some embodiments of the present disclosure.
Figure 7:
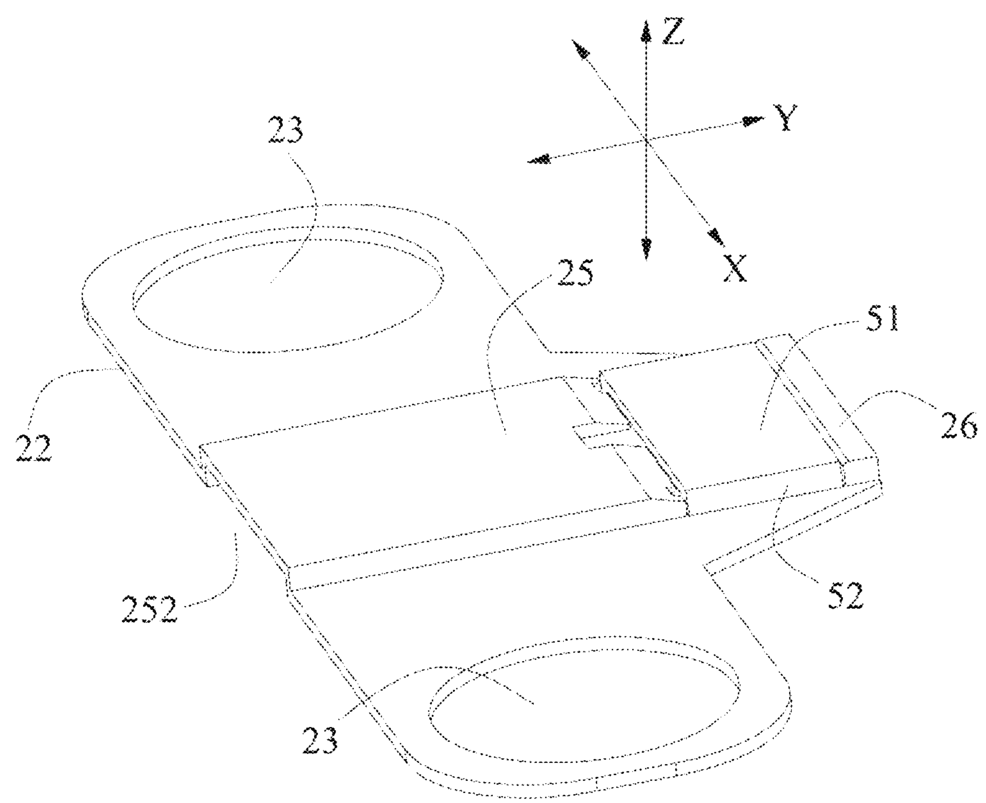
FIG. 7 is a three-dimensional assembling diagram of a positioning bracket and a fixing cover plate, according to some embodiments of the present disclosure.

Referring to FIGS. 2, 4, and 6, circuit board 3 can have a first main body portion 31 disposed above positioning bracket 2, and a mounting portion 32 located below first main body portion 31, contained in first opening 21 of positioning bracket 2 and supported on battery 1. Thermistor 4 can be fixedly disposed on mounting portion 32 of circuit board 3 and connected to the circuit inside circuit board 3.

Fixing cover plate 5 can tightly press mounting portion 32 of circuit board 3 in vertical direction Z to fix mounting portion 32 to top cover 11 of battery 1, thereby firmly fixing the thermistor 4 to top cover 11 of the battery 1.

Thermistor 4 can be directly disposed on circuit board 3, the mounting between the two is simple and straightforward, and the sampling can be realized without switching, thereby improving the connecting reliability between thermistor 4 and circuit board 3. Moreover, since fixing cover plate 5 can provide a fastening function for fixing thermistor 4, and prevent thermistor 4 from being detached from top cover 11 of battery 1 during the sampling, thereby improving the connecting reliability between thermistor 4 and top cover 11 of battery 1. Meanwhile, thermistor 4 can measure the temperature of top cover 11 of battery 1, and the temperature of top cover 11 of battery 1 is closer to the actual temperature of the battery 1 (i.e., the working temperature inside battery 1) compared to electrical connecting piece 6, such that the deviation between the temperature measured by thermistor 4 and the actual temperature of the battery is reduced, thereby greatly improving the accuracy of temperature measurement by thermistor 4.

Referring to FIGS. 2, 4, and 6, circuit board 3 can further have a second opening 33 penetrating first main body portion 31 in vertical direction Z, and a connecting portion 34, one end of which can be connected to first main body portion 31 in a cantilever manner in second opening 33, and the other end of which can be bent downward and extend out of second opening 33 to be connected to mounting portion 32.

During the use of the battery module, each battery 1 will generate the expansion deformation to a certain degree, and a certain relative movement is caused between top covers 11 of the two adjacent batteries 1. At this point, since connecting portion 34 is connected to first main body portion 31 in a cantilever manner in second opening 33, connecting portion 34 can be deformed under the action of an expansion force to absorb the expansion, thereby relieving the pulling action of the expansion force on mounting portion 32 of circuit board 3 in longitudinal direction Y.

In order to timely transmit the temperature of top cover 11 of battery 1 to thermistor 4 on circuit board 3, a heat conduction pad 8 can be disposed between mounting portion 32 of circuit board 3 and top cover 11 of battery 1 (as shown in FIG. 4). In some embodiments, a reinforcing sheet can be added on one side of mounting portion 32 of circuit board 3 facing battery 1, and the reinforcing sheet can be made of a metal having good thermal conductivity, which can enhance the heat conduction effect on one hand and contributes to the increase in the strength of circuit board 3 on the other hand, thereby further enhancing the fixing force of fixing cover plate 5 for mounting portion 32.

Referring to FIG. 4, a reinforcing plate 7 can be provided on circuit board 3 for thermistor 4. Specifically, reinforcing plate 7 can be disposed on both sides of thermistor 4 in longitudinal direction Y, and/or reinforcing plate 7 can be disposed on both sides of thermistor 4 in transverse direction X. Reinforcing plate 7 can extend in vertical direction Z and exceed thermistor 4 to provide a supporting force for fixing cover plate 5.

After fixing cover plate 5 is mounted, it can directly and tightly press reinforcing plate 7 in vertical direction Z, such that mounting portion 32 of circuit board 3 can be pressed tightly to fix thermistor 4 without making contact with thermistor 4, thereby preventing fixing cover plate 5 from crushing thermistor 4 during the pressing.

Referring to FIG. 4, heat conductive adhesive 9 can be used to fill between reinforcing plate 7 and thermistor 4. Thermal conductive adhesive 9 is configured to provide protection for thermistor 4 on one hand, and improve the heat conduction effect on the other hand.

Referring to FIGS. 6 to 10, positioning bracket 2 can further include a first supporting portion 25 protruding from second main body portion 22 in vertical direction Z, and a second supporting portion 26 protruding from first extending portion 24 in vertical direction Z. First main body portion 31 of circuit board 3 can be supported above first supporting portion 25 and second supporting portion 26 of positioning bracket 2.

When fixing cover 5 is assembled on positioning bracket 2, mounting portion 32 of circuit board 3 can be tightly pressed to fix thermistor 4. The exemplary ways of fixing between fixing cover plate 5 and positioning bracket 2 can include, but not limited to clamping, riveting, hot riveting, and adhering. Several fixing structures between fixing cover plate 5 and positioning bracket 2 are described in detail below.

In some embodiments, fixing cover plate 5 can be disposed between first main body portion 31 of circuit board 3 and battery 1. Specifically, referring to FIGS. 6 to 8, fixing cover plate 5 can have a third main body portion 51; a second extending portion 52 formed on both sides of third main body portion 51 in transverse direction X and extending downwardly in vertical direction Z; a first elastic protrusion 53 disposed on one side of second extending portion 52 close to first supporting portion 25 in longitudinal direction Y; and a second elastic protrusion 54 disposed on one side of second extending portion 52 close to second supporting portion 26 in longitudinal direction Y. First elastic protrusion 53 and first supporting portion 25 of positioning bracket 2 can be in fastening connection, and second elastic protrusion 54 and second supporting portion 26 of positioning bracket 2 can also be in fastening connection, such that third main body portion 51 of fixing cover plate 5 can tightly press mounting portion 32 of circuit board 3.

In the embodiments as discussed above, the mounting and dismounting between fixing cover plate 5 and positioning bracket 2 are simply based on the elasticity of first elastic protrusion 53 and second elastic protrusion 54, thereby improving the assembling efficiency.

Figure 8:
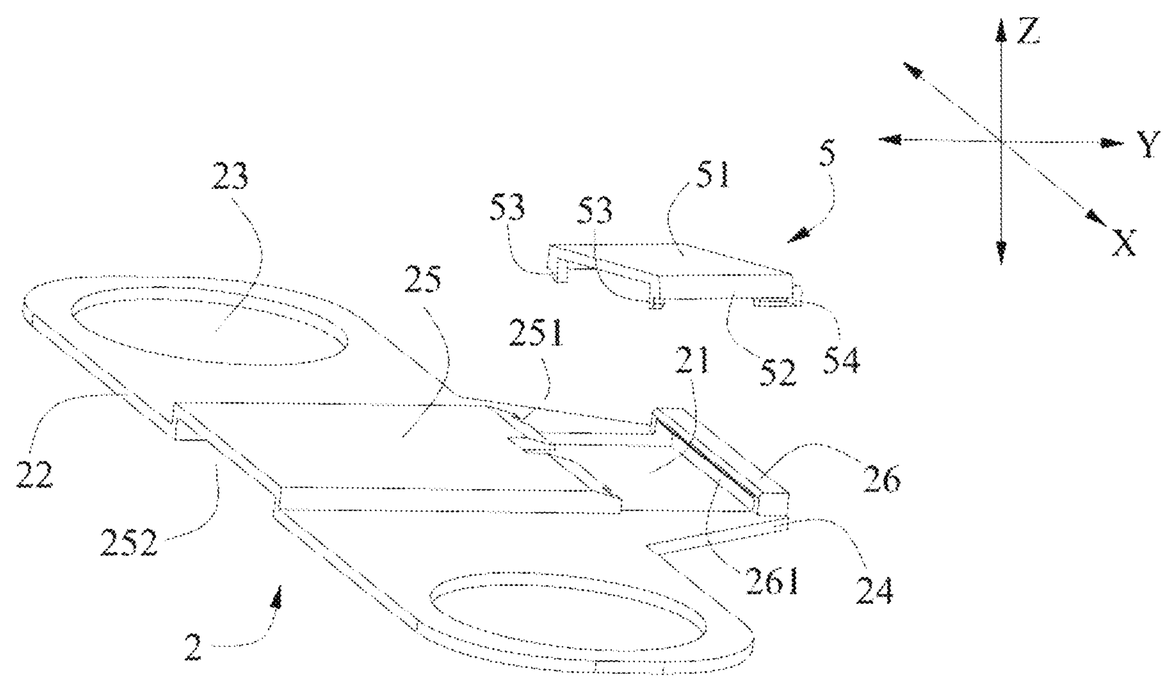
FIG. 8 is an exploded view of FIG. 7, according to some embodiments of the present disclosure.
Figure 9:
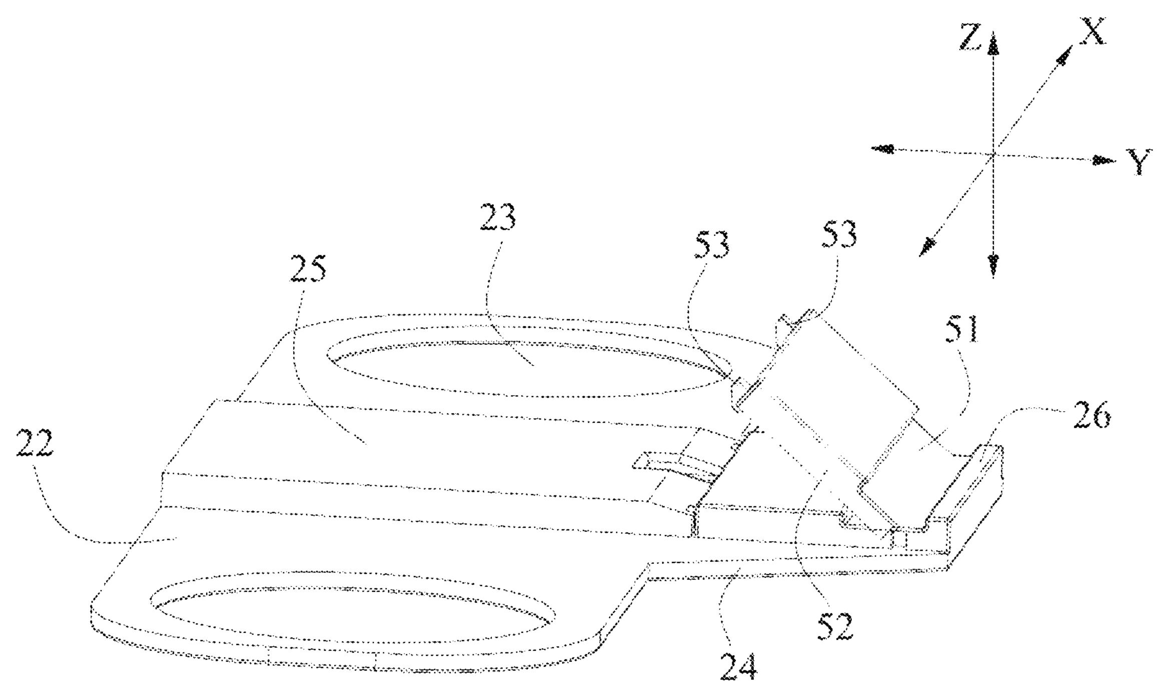
FIG. 9 is a three-dimensional assembling diagram of the positioning bracket and the fixing cover plate in another embodiment, wherein the dotted line part is a positional relationship diagram before the positioning bracket and the fixing cover plate are mounted, according to some embodiments of the present disclosure.

With reference to FIG. 8, first supporting portion 25 can be provided with a second fastening hole 251, and first elastic protrusion 53 can be fastened to first supporting portion 25 by second fastening hole 251. Second supporting portion 26 can be provided with a fastening groove 261, and second elastic protrusion 54 can be fastened to second supporting portion 26 by fastening groove 261.

In some embodiments, fixing cover plate 5 can be disposed between first main body portion 31 of circuit board 3 and battery 1. Specifically, referring to FIG. 9, fixing cover plate 5 can have a third main body portion 51, one end of which can be hinged to second supporting portion 26, and the other end of which can be capable of moving up and down relative to positioning bracket 2; a second extending portion 52 formed on both sides of third main body portions 51 along transverse direction X and extending downwardly in the vertical direction Z; and a first elastic protrusion 53 disposed on one side of second extending portion 52 close to first supporting portion 25. When it is necessary to tightly press mounting portion 32 of circuit board 3, the other end of third main body portion 51 can be pressed down until first supporting portion 25 and first elastic protrusion 53 are in fastening connection, such that third body portion 51 of fixing cover plate 5 can tightly press mounting portion 32 of circuit board 3. When it is necessary to release the fixing of mounting portion 32 of circuit board 3, the other end of third body portion 51 can be pulled up until first elastic protrusion 53 is detached from second fastening hole 251 of first supporting portion 25.

In the embodiment discussed above, since the one end of third body portion 51 is directly hinged to second supporting portion 26, in the process of mounting fixing cover plate 5, fixing cover plate 5 is not required to be positioned, and only the other end of third main body portion 51 of fixing cover plate 5 is needed to be pressed down directly, thereby simplifying the matching structure between fixing cover plate 5 and positioning bracket 2, and further improving the assembling efficiency.

In some embodiments, fixing cover plate 5 can be disposed above first main body portion 31 of circuit board 3. Specifically, referring to FIGS. 10 to 13, second supporting portion 26 can be provided with a first fastening hole 262 in vertical direction Z. Fixing cover plate 5 can have a third main body portion 51 located above first main body portion 31 of circuit board 3; a pressing portion 55 protruding from a position of third main body portion 51 corresponding to first opening 21; an inserting portion 56 protruding from third main body portion 51 in vertical direction Z and inserted into first fastening hole 262; and a third elastic protrusion 57 formed on one end of inserting portion 56 away from third body portion 51 and protruding circumferentially from inserting portion 56. Third elastic protrusion 57 can extend out of first fastening hole 262 and can be fastened to second supporting portion 26, such that pressing portion 55 of fixing cover plate 5 can tightly press mounting portion 32 of circuit board 3.

In the embodiment discussed above, fixing cover plate 5 can be directly assembled on positioning bracket 2 from the upper side of first main body portion 31 of circuit board 3, and is not interfered by circuit board 3 during the assembling, such that the assembling is simple and easy to operate, thereby further improving the assembling efficiency.

Figure 10:
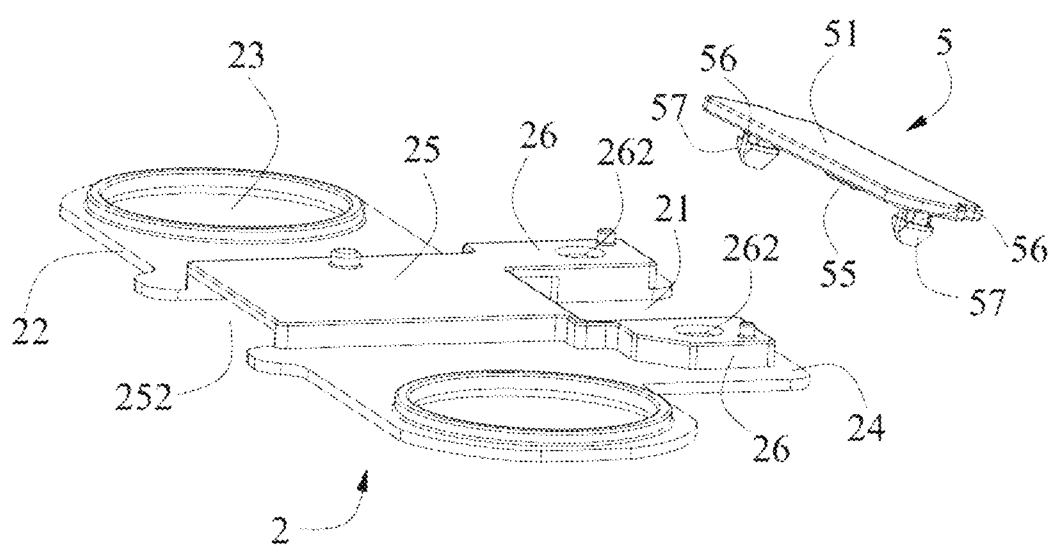
FIG. 10 is an exploded three-dimensional diagram of the positioning bracket and the fixing cover plate, according to some embodiments of the present disclosure.
Figure 11:
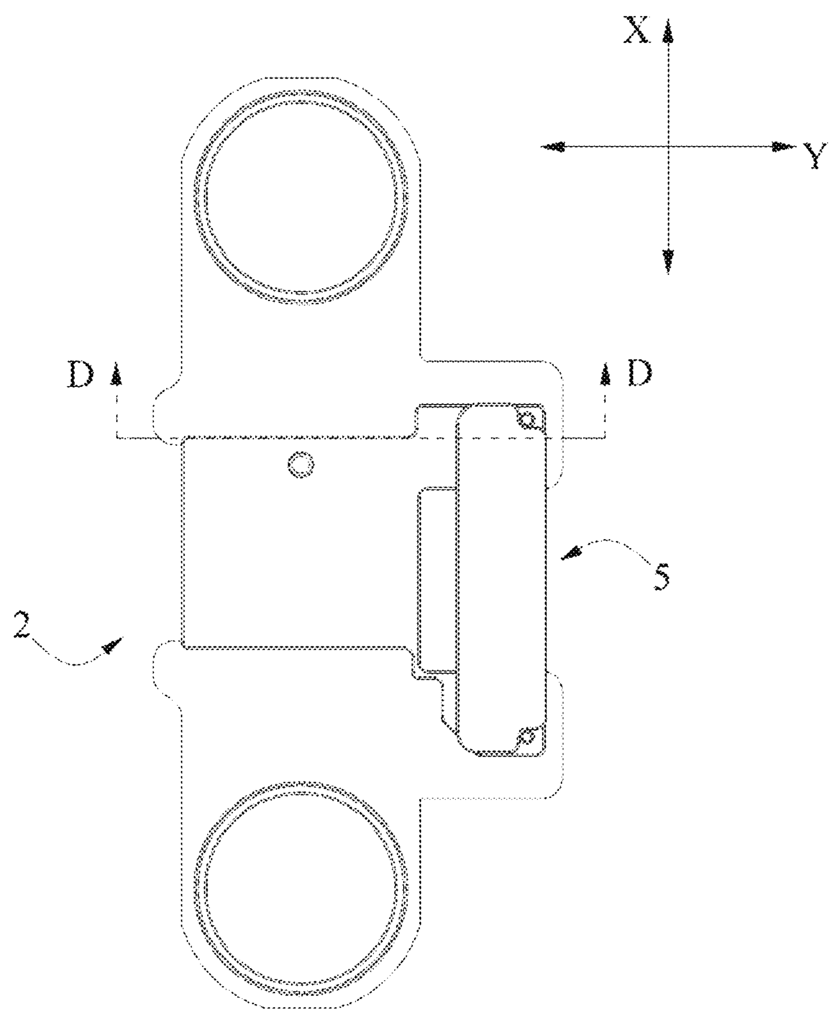
FIG. 11 is a top view after the positioning bracket and the fixing cover plate of FIG. 10 are assembled, according to some embodiments of the present disclosure.
Figure 12:
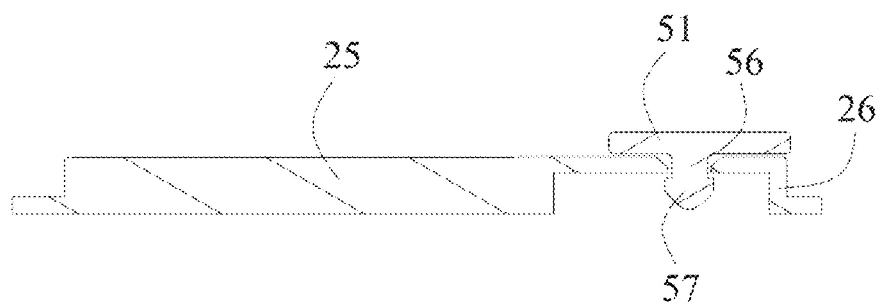
FIG. 12 is a cross-sectional view taken along the line D-D in FIG. 11, according to some embodiments of the present disclosure.
Figure 13:
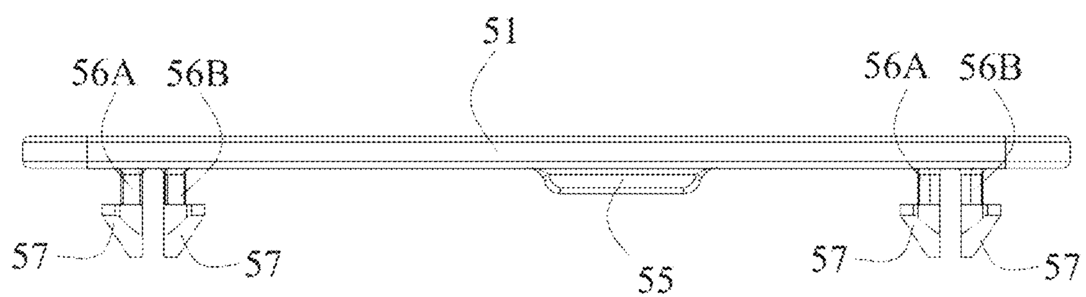
FIG. 13 is a front view of the fixing cover plate in FIG. 10, according to some embodiments of the present disclosure.

With further reference to FIGS. 10 and 13, inserting portions 56 can be disposed in pairs, and the pair of two inserting portions 56 can include: a first inserting portion 56A provided with a third elastic protrusion 57; and a second inserting portion 56B, spaced apart from first inserting portion 56A and provided with a third elastic protrusion 57. In some embodiments, third elastic protrusion 57 on first inserting portion 56A and third elastic protrusion 57 on second inserting portion 56B can be also disposed at an interval, such that two third elastic protrusions 57 can be relatively moved to be smoothly mounted during the mounting process of fixing cover plate 5.

Finally, it should be noted that when the battery module of the present disclosure can be applied to a battery pack, fixing cover plate 5 can also be an upper box cover of the battery pack. Under this circumstance, a corresponding pressing structure can be directly added in the corresponding area on the upper box cover to tightly press mounting portion 32 of circuit board 3.

It should be noted that, although the above embodiments have been described herein, the scope of present disclosure is not limited thereby. Therefore, based on the innovative concept of the present disclosure, modifications to the embodiments described herein, equivalent structural or process transformations based on the contents of the description and drawings of the present disclosure, and direct or indirect application of the above-described technical solutions in other related technical fields are included in the present disclosure.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery module, comprising:

(a) a plurality of batteries, each of the batteries comprising:

a top cover; and a positive terminal and a negative terminal disposed on the top cover at an interval in a transverse direction;

(b) a positioning bracket affixed onto one of the plurality of batteries, the positioning bracket comprising:

a second main body portion;

two first positioning holes disposed in the second main body portion and configured to receive the positive terminal and negative terminal of the one of the plurality of batteries without making an electrical connection between the positive terminal and the negative terminal; and a first extending portion extending longitudinally from one side of the second main body portion, the first extending portion having a width in a lateral direction that is less than a width of the second main body portion in the lateral direction and comprising a first opening;

(c) a circuit board comprising:

a first main body portion disposed above the positioning bracket; and a mounting portion located below the first main body portion, the mounting portion contained in the first opening and supported on the one of the plurality of batteries;

(d) a thermistor affixed on the mounting portion of the circuit board and located within the first opening of the first extending portion; and (e) a fixing cover plate pressed against the mounting portion of the circuit board in a vertical direction to fix the mounting portion to the one of the plurality of batteries.

2. The battery module according to claim 1, wherein:

the battery module further comprises an electrical connecting piece located above the second main body portion of the positioning bracket and connected to one or more of the positive terminal and the second terminal and a corresponding terminal of an adjacent battery of the plurality of batteries; and the mounting portion is secured to the top cover of the one of the plurality of batteries by the fixing cover plate.

3. The battery module according to claim 1, wherein the circuit board comprises:

a second opening in the first main body portion; and a connecting portion extending downward from the second main body portion through the second opening in the first main body portion, in which one end of the connecting portion is connected to the first main body portion and the other end of the connecting portion is bent and connected to the mounting portion.

4. The battery module according to claim 1, wherein:

the circuit board is provided with a reinforcing plate around of the thermistor, the reinforcing plate extends in the vertical direction and exceeds the thermistor, and the fixing cover plate is directly pressed against the reinforcing plate in the vertical direction, to press the mounting portion of the circuit board.

5. The battery module according to claim 2, wherein the positioning bracket comprises:

a first supporting portion protruding from the second main body portion in the vertical direction; and a second supporting portion protruding from the first extending portion in the vertical direction, wherein the first main body portion of the circuit board is supported above the first supporting portion and the second supporting portion of the positioning bracket.

6. The battery module according to claim 5, wherein the fixing cover plate is located between the first main body portion of the circuit board and the one of the plurality of batteries, and is disposed on the positioning bracket.

7. The battery module according to claim 6, wherein the fixing cover plate comprises:

a third main body portion;

a second extending portion formed on both sides of the third main body portion in the transverse direction and extending downwardly in the vertical direction;

a first elastic protrusion disposed on a side of the second extending portion close to the first supporting portion in a longitudinal direction; and a second elastic protrusion disposed on a side of the second extending portion close to the second supporting portion in a longitudinal direction, wherein the first elastic protrusion and the first supporting portion are secured together, and the second elastic protrusion and the second supporting portion are also secured together, thereby causing the third main body portion of the fixing cover plate to press the mounting portion of the circuit board.

8. The battery module according to claim 6, wherein the fixing cover plate comprises:

a third main body portion, in which one end of the third main body is hinged to the second supporting portion, and the other end of the third main body is configured to move up and down relative to the positioning bracket;

a second extending portion formed on both sides of the third main body portion in the transverse direction and extending downwardly in the vertical direction; and a first elastic protrusion disposed on a side of the second extending portion close to the first supporting portion, wherein the first supporting portion and the first elastic protrusion are secured together, thereby causing the third main body portion of the fixing cover plate to tightly press the mounting portion of the circuit board.

9. The battery module according to claim 5, wherein the fixing cover plate is located above the first main body portion of the circuit board and is disposed on the positioning bracket.

10. The battery module according to claim 9, wherein:

the second supporting portion is provided with a first fastening hole in the vertical direction;

the fixing cover plate comprises:

a third main body portion located above the first main body portion of the circuit board;

a pressing portion protruding from a position of the third main body portion corresponding to the first opening;

an inserting portion protruding from the third main body portion in the vertical direction and inserted into the first fastening hole; and a third elastic protrusion formed at an end of the inserting portion away from the third main body portion and protruding circumferentially from the inserting portion;

wherein the third elastic protrusion extends out of the first fastening hole and is secured to the second supporting portion, so that the pressing portion of the fixing cover plate is tightly pressed against the mounting portion of the circuit board.

11. A battery pack, comprising the battery module according to claim 1.

12. A vehicle, comprising:

a power source to provide power for the vehicle; and the battery pack according to claim 11 configured to provide electricity for the power source.

* * * * *